United States Patent [19]
Washio et al.

[11] 3,897,241
[45] July 29, 1975

[54] ETHANOLAMINE/ORGANIC CARBOXYLIC ACID COMPOSITION FOR ACCELERATING FRUIT RIPENING

[75] Inventors: Shigeaki Washio, Kobe; Yukiaki Kiguchi, Funabashi, both of Japan

[73] Assignee: Taki Fertilizer Manufacturing Co., Ltd., Japan

[22] Filed: Aug. 9, 1973

[21] Appl. No.: 387,196

[52] U.S. Cl. .................................. 71/113; 71/115
[51] Int. Cl.$^2$ ............................................ A01N 9/24
[58] Field of Search ............... 71/113, 115, 121, 77; 260/541, 542

[56] References Cited
UNITED STATES PATENTS

| | | | |
|---|---|---|---|
| 1,897,816 | 2/1933 | Othmer | 260/541 |
| 2,395,446 | 2/1946 | Benson | 71/113 |
| 2,618,545 | 11/1952 | Newcomer | 71/113 |
| 3,460,936 | 8/1969 | Abramitis | 71/113 |
| 3,535,263 | 10/1970 | Singh | 252/192 |

FOREIGN PATENTS OR APPLICATIONS
1,138,278  10/1962  Germany .............................. 71/115

OTHER PUBLICATIONS

Otsuka et al., "Acceleration of Fruit Ripening by Hydrazine des." (1969), CA72, No. 11575d, (1970).
Kamalyan et al., "Mech. of Ethanolamine Action as a Stimulant etc.," (1971), CA77, No. 44182e., (1972).
Ishigai et al., "Elongation of Pea Stem Sections by Indole, etc.," (1970), CA73, No. 119473d., (1970).
Kumamoto et al., "Abscission Induced by P-OH Ethylhydrazine etc.," (1967), Nature 216, pp. 1216-1217, (1967).

*Primary Examiner*—Glennon H. Hollrah
*Attorney, Agent, or Firm*—Wenderoth, Lind & Ponack

[57] ABSTRACT

The present invention relates to a fruit ripening accelerating agent characterized by containing an ethanolamine and an organic carboxylic acid of not higher than 8 carbon atoms and a solubility of not less than 0.5 part by weight in 100 parts by weight of water.

3 Claims, No Drawings

ETHANOLAMINE/ORGANIC CARBOXYLIC ACID COMPOSITION FOR ACCELERATING FRUIT RIPENING

This invention relates to an agent for accelerating or promoting fruit ripening.

Various kinds of fruit ripening accelerating agents have been already developed. However, too strict control is often required for the condition in their applications, and sometimes adverse secondary effects of the chemical agents have come to be known.

What has particularly been noted recently as a useful fruit ripening agent is Ethrel,

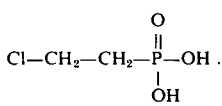

However, it is an expensive chemical and its effect is not always sufficient.

On the other hand, there is known a method (Japanese Pat. Publication No. 22231/1971) wherein an alkylamine salt of an organic acid of 8 to 22 carbon atoms is used as a plant growth repressing agent to improve the fruit yield. There has also been suggested a method wherein a urea adduct of a salt of an organic amine and carboxylic acid, or a compound obtained by bonding lignin or a lignin derivative compound with an alkanolamine is used as a fertilizer for crops. However, these methods are not fully satisfactory because the production of the chemical compounds is complicated, or even if the compounds are effective to the growth of plants they are not effective as fuit ripening accelerating agents.

It is well known in this technical field that ethylene is effective to accelerate the coloring of bananas and that it is often produced in fruit bodies prior to the ripening, and there are many papers reporting on the researches of the plant hormone effect of ethylene.

Noting such effect of ethylene, we have conducted various researches on fruit ripeninig accelerators and have found that, with an ethanolamine solution alone there is no sufficient effect but that, when it is used as mixed with a certain organic carboxylic acid, there is obtained an excellent ripening accelerating effect on fruits.

In the field of agricultural technology, ethanolamine has been already used for the emulsification of insecticides as a salt of a higher fatty acid (ethanolamine soap) and for a chelating agent together with a herbicide. It has also been suggested to use ethanolamine as a budding accelerating agent for beans. However, in such uses, the function as of a chemical control agent for fruits has not been noted at all.

The present invention is based on the before mentioned finding and is entirely different from such known uses of ethanolamine in the field of the general agricultural technology.

An object of the present invention is to provide a fruit ripening accelerating agent which is low in the cost and easy to produce.

Further objects of the invention will be apparent from the following description.

The ethanolamine which can be used in the present invention is such simple aminoalcohol as monoethanolamine, diethanolamine or triethanolamine. Organic carboxylic acid to be used is an organic carboxylic acid having not higher than 8 total carbon atoms, such as formic acid, acetic acid, propionic acid, butyric acid, oxalic acid, malonic acid, succinic acid, malic acid, citric acid, phthalic acid, maleic acid, fumaric acid, tartaric acid, pimelic acid, glutaric acid, adipic acid or valeric acid. One or more of such organic carboxylic acids dissolving by not less than 0.5 part by weight, preferably not less than 1 part by weight in 100 parts by weight of water can be used.

According to this invention there is used a mixed solution of the ethanolamine and organic carboxylic acid. The concentration of the ethanolamine to be used is 20 to 1000 p.p.m., preferably 100 to 600 p.p.m. calculated as $CH_2.CH_2$. The amount of the organic carboxylic acid may be such that the mol ratio of the ethanolamine/organic carboxylic acid is 0.1 – 20, preferably 1 – 15, because, in both of the case of the ethanolamine and the case of the organic carboxylic acid, if it deviates from the lower limit, the effect will not be sufficient and, if it deviates from the upper limit, there will be a physiological trouble.

The ethanolamine to be used in the present invention is a simple ethanolamine compound which is definitely distinguished from such amine salt chemically bonded with another compound as is mentioned above, because, in case it becomes an amine salt, such fruit ripening effect as of the solution of the present invention will not be able to be expected.

However, it is needless to say that, in case an amine salt is made an aqueous solution, a free ethanolamine will be produced by dissociation and, in case the organic carboxylic acid of the present invention is present, a fruit ripening accelerating effect will be able to be expected.

The time of applying the fruit ripening accelerating agent of the present invention is different depending on the particular fruit to which it is to be applied, but it is preferable to apply the same 10 to 150 days before the expected time of the completion of the ripening.

If the treatment is made under the conditions remarkably deviating from such conditions as in the above, a desirable effect will be hard to obtain. But, there is no such extreme evil influence or soil pollution as is caused by an improper application of a general chemical control agent.

For example, the following Table 1 shows the effects

Table 1

Pear (Nijusseiki kind) Ripening Acceleration Tests.

| Items | Concentration (p.p.m.) of the treating agent | | | | |
|---|---|---|---|---|---|
| | Not applied (Control) | 10 p.p.m. (Control) | 50 p.p.m. (Present invention) | 250 p.p.m. (Present invention) | 1500 p.p.m. (Control) |
| Tone of the fruits | Greenish | Greenish and bad | Yellow | Yellow | Yellow |
| Weight (g.) | 255 | 265 | 320 | 330 | 260 |

Table 1—Continued

Pear (Nijusseiki kind) Ripening Acceleration Tests.

| Items | Concentration (p.p.m.) of the treating agent | | | | |
|---|---|---|---|---|---|
| | Not applied (Control) | 10 p.p.m. (Control) | 50 p.p.m. (Present invention) | 250 p.p.m. (Present invention) | 1500 p.p.m. (Control) |
| Hardness (kg./cm.$^2$) | 19.5 | 19.0 | 11.8 | 12.0 | 11.0 |
| Saccharose concentration (%) | 9.3 | 9.2 | 10.5 | 10.2 | 10.0 |
| Final judgment of quality | Bad | Bad | Excellent | Superior | Inferior (many small fruits) | of a composition of this invention when it was sprayed as a diethanolamine-formic acid mixed aqueous solution to the leaves of 15 years old pear-trees (Nijusseiki kind) at a rate of 200 l. per 10 ares (4 l. per tree). In this case the molar ratio of diethanolamine and formic acid was 2.0, and the calculated concentrations of $CH_2CH_2$ based on diethanolamine were adjusted to 10, 50, 250 and 1500 p.p.m. The spraying was conducted about one month before the ripening completion expected time (an average of past 4 years). The fruits were cropped on the 15th day after the application and their qualities were investigated (respectively of averages of 50 fruits).

As seen in the results in Table 1, the ripening accelerating effect of the present invention will be apparent. In case they are treated with the chemical agent of the present invention, the fruits will be able to be cropped about half a month earlier than in an ordinary case. Further, it has been recognized as a result of long observations that, in case it is applied at a high concentration (i.e. 1500 p.p.m.), the fruits will deteriorate in the quality and will reduce in the value but no such decisive adverse influence as the dehiscence of fruits will be recognized and there will be no influence at all on the fruit tree itself. Therefore, a concentration of the ethanolamine of 10 to 1000 p.p.m. as of $CH_2CH_2$ is preferable.

Then we have also confirmed the effects of the organic carboxylic acids. The results are shown as in Table 2. All the amine/acid compositions used here had on the 15th day after the application and their qualities were investigated (respectively of the averages of 50 fruits).

As apparent from the above table, even if the ethanolamine concentration is in a proper range, in case the organic carboxylic acid is not present or is not in a proper mol ratio, no ripening accelerating effect will be able to be expected.

The working mechanism of the fruit ripening accelerating agent of the present invention is not exactly known but it can be considered that, in the fruit tree or fruit body, $—CH_2—CH_2—$ and $N \lessdot$ of the ethanolamine, presumably as ethylene and nutrient N, synergestically develop a ripening accelerating effect, and it is supposed that the organic carboxylic acid as an effective carrier of the ethanolamine accelerates the absorption of the ethanolamine by the fruit tree or fruit and catalytically helps the conversion of the ethanolamine to ethylene and nutrient N.

The amount of the fruit ripening accelerating agent of the present invention to be applied varies depending on the kind of the fruit tree and the time of application, but generally it is preferable to spray the agent on the leaf surfaces and fruit surfaces at a rate of 20 to 5000 liters or preferably 100 to 1000 liters per 10 ares of the cultivating area. However, it is as described above that the fruit ripening accelerating agent of the present invention does not cause such extreme adverse influence or soil pollution as by the improper application of a Table 2

Pear (Nijusseiki kind) Ripening Acceleration Tests.

| | Control | Present invention | Present invention | Present invention | Control |
|---|---|---|---|---|---|
| Mol ratio of monoethanolamine/propionic acid | 0 | 0.8 | 10 | 20 | 30 |
| Tone of the fruit | Greenish | Yellow | Yellow | Yellow | Yellow |
| Weight (g.) | 293 | 342 | 350 | 348 | 288 |
| Hardness (kg./cm.$^2$) | 17.5 | 12.4 | 11.5 | 10.7 | 8.5 |
| Saccharose concentration (%) | 9.3 | 9.6 | 10.4 | 11.9 | 11.9 |
| Malic acid content (%) | 0.19 | 0.13 | 0.10 | 0.09 | 0.08 |
| Final judgment of quality | Bad | Excellent | Excellent | Excellent | Bad | a $CH_2CH_2$ concentration of 500 p.p.m. based on monoethanolamine concentration and different amine/acid mol ratios, while the control was an aqueous solution of monoethanolamine itself having a $CH_2CH_2$ concentration of 500 p.p.m. They were sprayed on the leaves of 13 years old "Nijusseiki" pear-trees at a rate of 300 liters per 10 ares (6 liters per fruit tree) about one month earlier than the expected ripening completion time (average of past 4 years). The fruits were cropped general chemical control agent.

As fruits to which the present invention can be applied, there can be exemplified apples, pears, persimmons, grapes, grape fruits, lemons, oranges, bananas, coconuts and peaches but the application is not limited to them.

The present invention will be explained in more detail by means of the following examples.

EXAMPLE 1

The agent was applied to persimmons (Fuyu kind) of trees 17 years of age under the below mentioned conditions in the early period of 20 to 30 percent coloring of the fruits. (Each tree bore about 800 fruits on the average.)

1. Chemical agent composition:

A mixed aqueous solution of diethanolamine and triethanol amine and succinic acid (mol ratio 2:2:1) with a $CH_2CH_2$ concentration of di- and triethanolamine of 800 p.p.m.

2. Applying condition:

The above mentioned chemical agent was sprayed on leaf surfaces at a rate of 200 liters per 10 ares (5 liters per fruit tree). The same amount of water was sprayed on the control section.

The fruits were cropped on the 25th day after the application and the qualities of 100 of them were investigated. As a result, it was recognized that, as compared with the nonapplied section, the saccharose concentration was 1.25 higher on the average and the fruit weight was 32 g. higher on the average (the average weight of 100 fruits was 216 g.).

EXAMPLE 2

The agent was applied to oranges (Unshu kind) of trees 8 years of age under the following conditions in the period of 50 percent coloring. (Each tree bore about 560 fruits on the average.)

1. Chemical agent compositions:
    a. Monoethanolamine-oxalic acid mixed aqueous solution (mol ratio 16:1); $CH_2CH_2$ concentration of monoethanolamine 200 p.p.m.
    b. Monoethanolamine-butyric acid mixed aqueous solution (mol ratio 8:1); $CH_2CH_2$ concentration of monoethanolamine 200 p.p.m.
    c. Monoethanolamine-malonic acid mixed aqueous solution (mol ratio 2:1); $CH_2CH_2$ concentration of monoethanolamine 200 p.p.m.
    d. Aqueous solution of monoethanolamine; $CH_2CH_2$ concentration 200 p.p.m.

2. Applying condition:

Each of the above mentioned chemical agents (a) to (d) was sprayed on leaf surfaces at a rate of 500 liters per 10 ares (2 liters per fruit tree) (in the respective spraying sections (a) to (d)).

The fruits were cropped on the 20th day after the application, and the qualities of 100 of them were investigated.

EXAMPLE 3

The chemical agent of the present invention was sprayed on apples (Kogyoku kind) of tree 32 years of age and the coloring accelerating effect was investigated.

1. Spraying date: September 24, 1970.
2. Chemical agent compositions:
    a. Triethanolamine-maleic acid mixed aqueous solution (mol ratio 3:1); $CH_2CH_2$ concentration of triethanolamine 50 p.p.m.
    b. Triethanolamine-glutaric acid mixed aqueous solution (mol ratio 3:1); $CH_2CH_2$ concentration of triethanolamine 50 p.p.m.
    c. Triethanolamine-adipic acid mixed aqueous solution (mol ratio 3:1); $CH_2CH_2$ concentration of triethanolamine 50 p.p.m.
    d. Aqueous solution of triethanolamine; $CH_2CH_2$ concentration 50 p.p.m.

Each of the above mentioned chemical agents was sprayed at a concentration of 150 liters per 10 ares and the colored effects in 10, 20 and 30 days after it was sprayed were investigated.

Table 4

| Number of days after the treatment | Treating section | | | |
|---|---|---|---|---|
| | Section a | Section b | Section c | Section d |
| 10 days | + | + | + | + |
| 20 days | ++ | ++ | ++ | + |
| 30 days | +++ | +++ | +++ | ++ |

Notes:
+++ : Good coloring.
++ : Rather good coloring.
+ : Insufficient coloring.

EXAMPLE 4

Each of the following chemical agents was sprayed on grape (Kyoho kind) trees and the saccharose concentration and ripened degree were investigated.

1. Chemical agent compositions:
    a. Diethanolamine-malic acid mixed aqueous solution (mol ratio 11:1); $CH_2CH_2$ concentration of diethanolamine 700 p.p.m.
    b. Diethanolamine-phthalic acid mixed aqueous solution (mol ratio 11:1); $CH_2CH_2$ concentration of diethanolamine 700 p.p.m.
    c. Diethanolamine-fumaric acid mixed aqueous solution (mol ratio 11:1); $CH_2CH_2$ concentration of diethanolamine 700 p.p.m.
    d. Aqueous solution of diethanolamine; $CH_2CH_2$ concentration 700 p.p.m.
2. Spraying time: August 4, 1970.
3. Applied amount: 1 c.c. was sprayed per cluster.
4. Cropping time: August 26, 1970.

Table 3

| | Not applied (Control) | Section a (Present invention) | Section b (Present invention) | Section c (Present invention) | Section d (Control) |
|---|---|---|---|---|---|
| Tone of the fruit | 70 % colored | 90 % colored | 90 % colored | 90 % colored | 70 % colored (Part of the leaf surface was damaged |
| Saccharose concentration (%) | 10.7 | 11.3 | 11.0 | 11.4 | 10.0 |
| Citric acid content (%) | 1.8 | 1.4 | 1.5 | 1.5 | 1.7 |
| Final judgment | Unripened | Good quality | Good quality | Good quality | Unripened |

Table 5

|  | Present invention Section a | Present invention Section b | Present invention Section c | Control Section d |
|---|---|---|---|---|
| Saccharose concentration (%) | 17.2 | 16.8 | 17.6 | 14.7 |
| Ripened degree | Blackish purple | Blackish purple | Blackish purple | Reddish purple |
| Cluster weight | 273 | 268 | 259 | 238 |

Note: The cluster weight was an average of the weights of 30 clusters.

EXAMPLE 5

Each of the below mentioned spraying agents was sprayed on peach trees (Okubo kind) 8 years of age and the weight, colored degree, hardness, saccharose concentration were measured. The results were as in the following.

1. Sprayed chemical agents:
   a. Triethanolamine-citric acid mixed aqueous solution (mol ratio 1:1); $CH_2CH_2$ concentration of triethanolamine 900 p.p.m. ----- Section a.
   b. Triethanolamine-acetic acid mixed aqueous solution (mol ratio 1:1); $CH_2CH_2$ concentration of triethanolamine 900 p.p.m. ----- Section b.
   c. triethanolamine-tartaric acid mixed aqueous solution (mol ratio 1:1); $CH_2CH_2$ concentration of triethanolamine 900 p.p.m. ----- Section c.
2. Applied time: 50th day afer the full blossom.
3. Cropped: August 12, 1968.
4. Applied amount: 1 liter per peach tree.

Table 6

|  | Colored degree (%) | | | | Saccharose concentration (%) |
|---|---|---|---|---|---|
|  | Slight | Little | Medium | uch |  |
| Present invention Section a | 18 | 25 | 29 |  | 11.8 |
| Present invention Section b | 16 | 20 | 26 | 38 | 10.9 |
| Present invention Section c | 20 | 24 | 29 | 27 | 11.6 |
| Nonapplied section | 62 | 18 | 15 | 5 | 11.3 |

Note: Criteria of the colored degree.
  Slight : The coloring was on less than 10 % of the fruit surface.
  Little : The coloring was on 10 to 40 % of the fruit surface.
  Medium : The coloring was on 40 to 70 % of the fruit surface.
  Much : The coloring was on more than 70 % of the fruit surface.
  50 fruits were investigated.

By the way, in the present invention, the hardness, saccharose concentration, malic acid content and citric acid content were tested by the below mentioned methods:

Hardness: By using an Iio type hardness tester.
Saccharose concentration: By using an Atago type saccharose concentration tester.
Malic acid content: The fruit juice was titrated with 0.1 % sodium hydroxide by using methyl red as an indicator and was converted to malic acid.
Citric acid content: The fruit juice was titrated with 0.1 N sodium hydroxide by using methyl red as an indicator and was converted to citric acid.

What is claimed is:

1. A method for accelerating the ripening of fruit which comprises applying to a fruit-bearing plant from 10 to 150 days prior to the expected ripening time an effective amount of a fruit ripening accelerating agent comprising an ethanolamine selected from the group consisting of monoethanolamine, diethanolamine and triethanolamine and an organic carboxylic acid selected from the group consisting of formic acid, acetic acid, oxalic acid, succinic acid, adipic acid, butyric acid, phthalic acid, maleic acid, citric acid, fumaric acid, malic acid, tartaric acid, glutaric acid, pimelic acid, malonic acid, propionic acid and valeric acid, the concentration of said ethanolamine being 10 to 1,000 p.p.m., calculated as $CH_2CH_2$, the mol ratio of the ethanolamine/organic carboxylic acid being 0.1 to 20, with an inert carrier for said agent.

2. A method according to claim 1 wherein said carrier is water.

3. A method according to claim 1 wherein the applied amount is 20 to 5000 liters per 10 ares of the cultivating area.

* * * * *